United States Patent [19]
Winkel

[11] 3,949,630
[45] Apr. 13, 1976

[54] METHOD AND APPARATUS FOR TRIMMING BATTERY GRID PLATES

[76] Inventor: Herbert C. Winkel, 6225 U.S. Highway 301, Bradenton, Fla. 33507

[22] Filed: Oct. 21, 1974

[21] Appl. No.: 516,427

[52] U.S. Cl. .................. 83/39; 83/237; 83/247; 83/255; 83/268; 83/391; 83/404; 83/467 R; 83/620; 83/903
[51] Int. Cl.² ............................................. B26D 7/16
[58] Field of Search ....... 83/903, 39, 255, 237, 247, 83/268, 269, 213, 620, 391, 467, 419, 404; 29/2

[56] References Cited
UNITED STATES PATENTS

| | | | |
|---|---|---|---|
| 2,061,647 | 11/1936 | Berkowitz | 83/213 X |
| 3,051,030 | 8/1962 | Winkel | 83/903 X |
| 3,496,816 | 2/1970 | Doerfler et al. | 83/404 X |
| 3,623,540 | 11/1971 | Goodwin et al. | 83/467 X |
| 3,712,164 | 1/1973 | Meschke et al. | 83/903 X |

Primary Examiner—Frank T. Yost
Attorney, Agent, or Firm—Klarquist, Sparkman, Campbell, Leigh, Hall & Whinston

[57] ABSTRACT

Battery grid plate castings are trimmed in a two-step operation. Each plate moves flat along a horizontal or inclined path against a first stop bar. One of two trim blades on a reciprocating upper die block then shears flashing from the leading end of the plate during a downward stroke of the die. Then the stop bar raises during the upward stroke of the die, and the plate moves forwardly against a second stop. Upon the next downward die stroke the second trim blade shears flashing from the trailing edge of the plate. During the next upward stroke, the fully trimmed plate moves forwardly onto a stacking device. As the leading end of one plate is trimmed at the first trim station, the trailing end of a preceding plate is trimmed at the second trim station. The second stop is easily moved to different stop positions along the path of travel of the plates to change the distance between such stop and the second trim blade and thereby enable trimming plates of different lengths without changing dies.

23 Claims, 11 Drawing Figures

METHOD AND APPARATUS FOR TRIMMING BATTERY GRID PLATES

BACKGROUND OF THE INVENTION

In conventional trim dies for battery grid-casting machines, as shown, for example, in U.S. Pat. No. 2,638,982, the leading and trailing ends of each grid plate are trimmed simultaneously by a pair of knives fixed to a common movable die member. Because the distance between these two trim knives is fixed, such prior trim dies can only be used for trimming plates of one size. When a larger or smaller grid plate is cast, the trim die must be changed to accomodate the change in plate size. This requires the shut down of the battery grid-casting machine for a long period of time, and consequently results in the loss of valuable production time. This also requires that two or three sets of very expensive dies be kept on hand for each grid-casting machine, and usually a battery manufacturing plant will have at least several such machines.

Another problem with prior trim dies is caused by the fact that the grid plates are fed by gravity into the die. A plate will sometimes hang up in its gravity feed path because of slight imperfections in the plate or path, and therefore the plate may not be fully inserted into the die before the die closes, or the plate may not be inserted squarely into the die, resulting in either case in an imperfectly trimmed plate which must be discarded.

In prior trim dies the plate to be trimmed is supported on a stationary die block between the pair of trim knives. Because the knives trim the opposite ends of each lead plate simultaneously, and lead tends to cut "tight", the trimmed plate can become wedged between the knives, causing problems in ejecting the plate from the die after trimming.

Accordingly, there is a need for an improved method and apparatus for trimming grid plate castings which will avoid the foregoing problems of prior trimming methods and apparatus.

SUMMARY OF THE INVENTION

The present invention provides an improved method and apparatus for trimming flashing from the opposite ends of a grid plate.

The method and apparatus of the invention enable the use of a single trim die for trimming grid plates of many different sizes without changing dies and without any substantial loss of production time through provision of an adjustable stop device in conjunction with the second of two trim knives. Thus the prior need for having several sets of trim dies for each casting machine is avoided.

The method and apparatus of one form of the invention also provides a positive feed of grid plates into the trim die, thereby eliminating the problems associated with the gravity feed of prior trim dies. However, the trim die of the invention is applicable to both gravity feed along an inclined pathway and positive feed along a horizontal pathway.

Another apparatus feature of the present invention is its two-step trimming operation whereby flashing is trimmed from the top and bottom edges of a grid plate in two separate trimming operations within the trim die to avoid the ejection problems of prior trimming apparatus.

A further feature of the two-step trimming operation of the present invention is that it enables trimming of grid plates at each of two trim stations within the trim die simultaneously.

The foregoing and other features, objects and advantages of the present invention will become more apparent from the following detailed description, which proceeds with reference to the accompanying drawings.

DETAILED DESCRIPTION

General Arrangement

Figure 1:
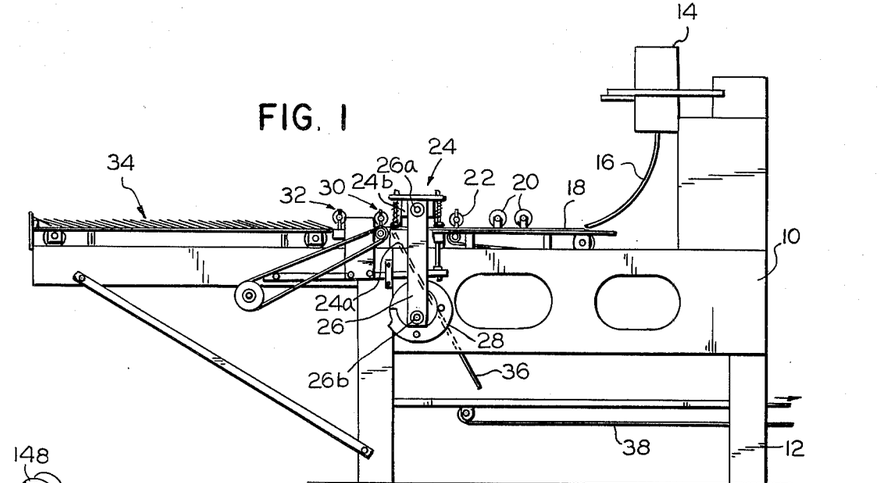
FIG. 1 is a side elevational view of a battery grid-casting machine equipped with a trim die apparatus in accordance with the invention.

With reference to the drawings, FIG. 1 shows somewhat schematically a typical grid-casting machine of the general type disclosed more completely in U.S. Pat. No. 2,638,982. Such machine includes a sturdy machine frame 10 supported on legs 12 and provided at an upper forward end with a grid-casting mold 14 of well-known design. The mold, shown closed, opens periodically to eject a single lead grid plate casting P, shown in FIG. 10, onto an inclined slide 16 which delivers the plate casting flat onto a continuously driven belt conveyor 18.

The conveyor moves each plate horizontally in succession beneath idler rolls 20 and a pressure feed roll 22 into the trim die apparatus of the invention, shown generally at 24. The trim die includes a stationary lower die portion 24a below the path of travel of the grid plates and a vertically reciprocative upper die portion 24b above such path. The upper die portion is reciprocated by an eccentric drive including a connecting rod 26 pivotally connected at 26a to the upper die and eccentrically connected at 26b to a continuously rotating crank wheel 28. An identical eccentric drive is positioned at the opposite side of the casting machine frame and is connected to the opposite end of the movable upper trim die.

Trimmed grid plates are conveyed from the trim die by pairs of pinch rolls 30, 32 and transfer belts extending between such rolls onto a stacking conveyor table 34 forming a rear extension of the frame 10 of the grid-casting machine. Stacking table 34 includes an intermittently driven belt conveyor 102, shown in FIGS. 2 and 4.

Scraps of lead from the trimming operation drop from the trim die area into the inclined chute 36 and fall by gravity onto the scrap conveyor belt 38, which conveys the scraps back to a collection point for recycling.

Trim Die Apparatus

Figure 3:
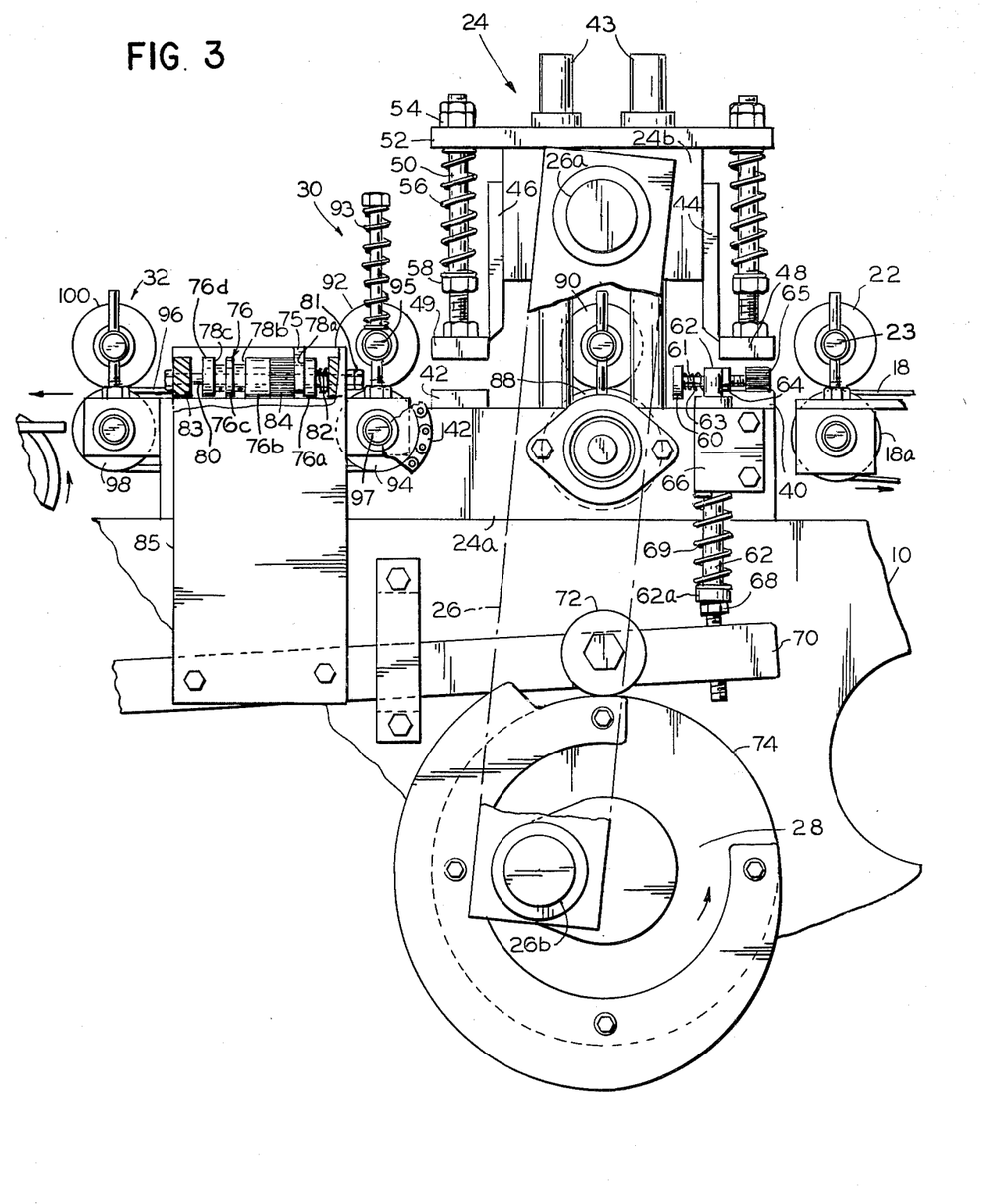
FIG. 3 is an enlarged elevational view of the trim die portion of FIG. 1 with exterior portions broken away for clarity.
Figure 4:
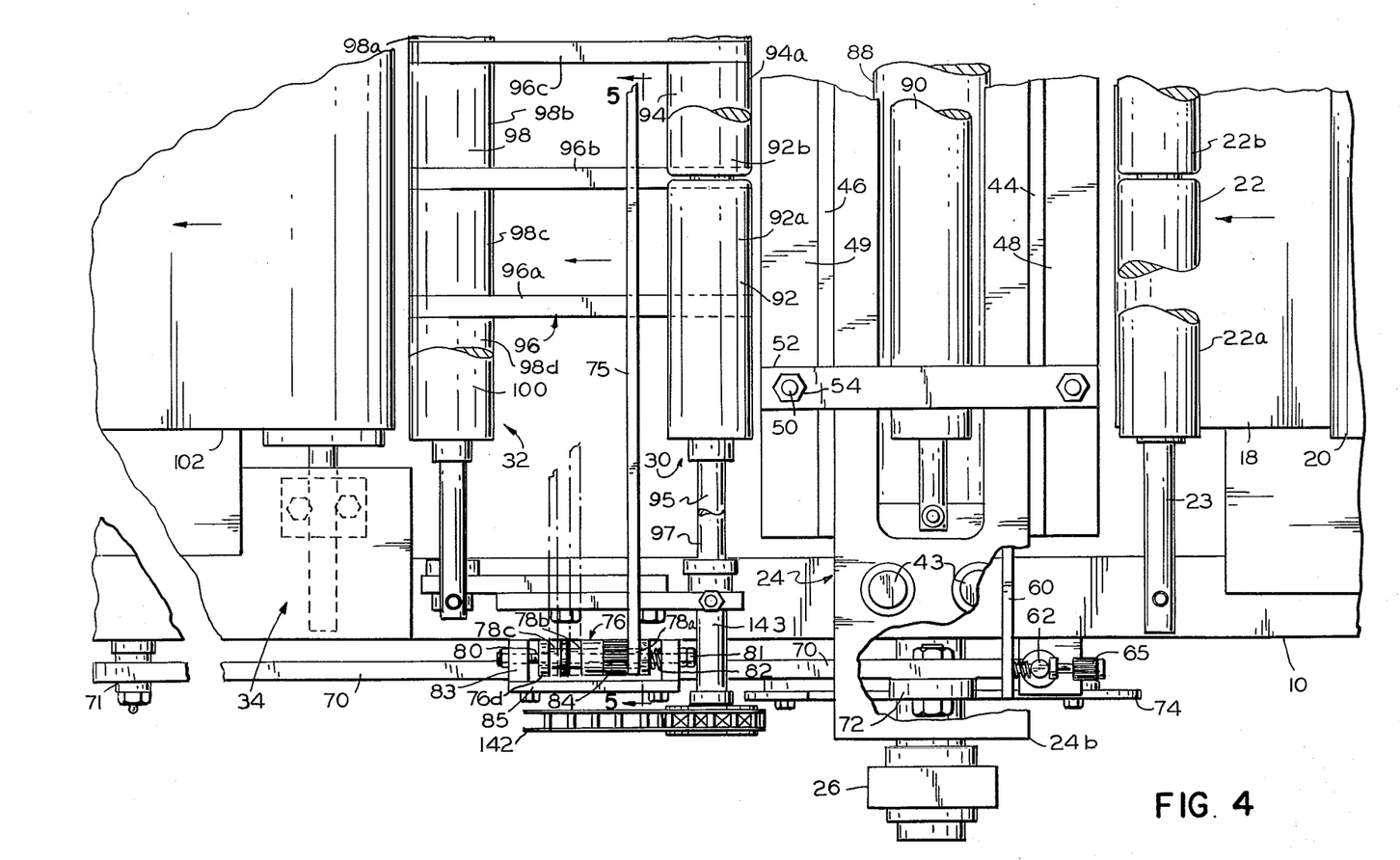
FIG. 4 is a top plan view of the portion of the trim die apparatus shown in FIG. 3 showing only a partial width of the apparatus.

Referring to FIGS. 3 and 4, the trim die apparatus is positioned along the horizontal conveyor path of the grid plates. The lower stationary die portion 24a includes two stationary shear blocks 40, 42 spaced from one another along the conveyor path. Both blocks have flat upper surfaces for supporting the portion of each grid plate to be trimmed. The first block 40 is positioned just downstream of the pressure infeed roll 22 and the offbear end of the infeed conveyor belt 18. The second shear block 42 is positioned just upstream of the outfeed pinch rolls 30.

The upper movable die element 24b is mounted for vertical reciprocation on guide rods 43. A pair of trim knife blades 44, 46 are fixed one to each of the opposite sides of the upper die in position for shearing cooperation with the inside edges, respectively, of shear blocks 40 and 42. Together each shear block and its cooperative trim knife blade define a trim knife means for shearing excess lead from the leading or trailing end of a grid plate progressing downwstream along the conveyor path.

Each trim knife blade 44, 46 has an associated hold-down foot 48, 49, respectively, which presses a portion of the grid plate to be trimmed against the top surface of associated shear block 40 or 42 just before the blade 44 or 46 shears the flashing from the grid plate. With reference to hold-down foot 49, each such foot is threaded to the lower end of a vertical threaded rod 50 which extends upwardly from the foot through an opening in a transverse support arm 52. The upper end of the rod 50 carries a nut 54 which suspends the rod from the arm. A coil spring 56 extending about the rod between arm 52 and another nut 58 just above the foot urges the foot downwardly to a position just below the lower cutting edge of the knife blade. As each blade 44, 46 moves down through its cutting stroke through downward movement of the upper die, each foot 48, 49 first engages the grid plate and presses it against the lower shear block before the associated blade shears scrap metal from the plate. Because of the spring mounting of each foot, its associated blade moves downwardly across the inside edge of the shear block after downward movement of the foot is stopped by the upper surface of such block, as shown, for example, in FIG. 6.

A stop means associated with each trim knife is movable into and out of the conveyor path to interrupt movement of a grid plate along such path and properly position the plate for trimming. Such stop means includes a first stop bar 60, shown best in FIG. 4, extending across the width of the conveyor path. Stop 60 is in a relatively fixed position along the conveyor path a short distance downstream from first trim knife 44. In fact, the distance between the front face of bar 60 and the cutting edge of knife blade 44 is equal to the length of each of a pair of indexing lugs L at the leading edge $E_1$ of the grid plate P of FIG. 10. Thus when stop 60 is in its "down" position shown in FIG. 3, indexing lugs L of the grid plate casting P will abut the stop and position the plate so that trim knife 44 will trim both lugs L and the metal flashing F-1 from the leading end of the plate along trim line T-1.

Although the position of stop 60 is relatively fixed along the length of the conveyor path, a fine adjustment of such stop along such path provides for slight variations in the lengths of indexing lugs on plates formed in different molds. This adjustment is provided through the mounting of each end of stop 60 on one end of a horizontal shaft 61 which extends slidably through the upper end of a larger stop lifter shaft 62. A coil spring 63 between stop 60 and shaft 62 urges the bar and shaft in a downstream direction. An adjustment nut 64 threaded onto shaft 61 abuts the upstream side of lifter shaft 62, thereby determining the downstream position of stop 60. An enlarged knurled end 65 of stop shaft 61 enables easy screw adjustment of the stop by threading it through nut 64. An identical adjustment is provided at the side of the frame opposite the side shown in FIGS. 3 and 4.

The periodic lifting of stop 60 is provided through vertical reciprocation of stop lifter rod 62. Such rod extends from the stop shaft 61 downwardly through a guide bracket 66 fixed to the side of lower die 24a to an enlarged lower end 62a urged into engagement with the upper end of a stop lifter 68 by a coil spring 69 surrounding the rod between guide bracket 66 and the rod's lower end 62a. Stop lifter 68 is threaded through the forward, free end of a cam follower arm 70 extending along the machine frame and pivoted at its opposite end at 71 to such frame, as shown in FIG. 4. Follower arm 70 carries a cam follower wheel 72 which engages the circumferential cam surface 74 of crank wheel 28 to coordinate the lifting and lowering of the stop bar 60 in timed relation to the reciprocating movement of upper trim die 24b. An identical stop-lifting mechanism is provided at the opposite side of the machine frame.

The second or rear stop means for the rear trim knife 46 includes a second stop bar 75 extending across the width of the conveyor path. The opposite ends of stop bar 75 are mounted in a pair of stop-positioning means 76 at opposite sides of the frame. Each stop positioner 76 defines multiple predetermined stop positions along the conveyor path. The illustrated stop positioner 76 is a cylindrical spool with lands 76a, 76b, 76c, 76d separated by three annular grooves 78a, 78b, 78c defining three stop positions. The spool is threaded on a shaft 80 supported at its opposite ends by arms 83 of a stop lifter plate 85. The opposite ends of shaft 80 are secured by nuts 81 to prevent axial displacement of the shaft on arms 83. A coil spring 82 surrounding shaft 80 between land 76a and one arm 83 restrains spool 76 against rotation. However, a knurled portion 84 of large land 76b facilitates rotation of spool 76 on shaft 80 for fine adjustment of the stop positions along the conveyor path.

Figures 2, 5, 10:
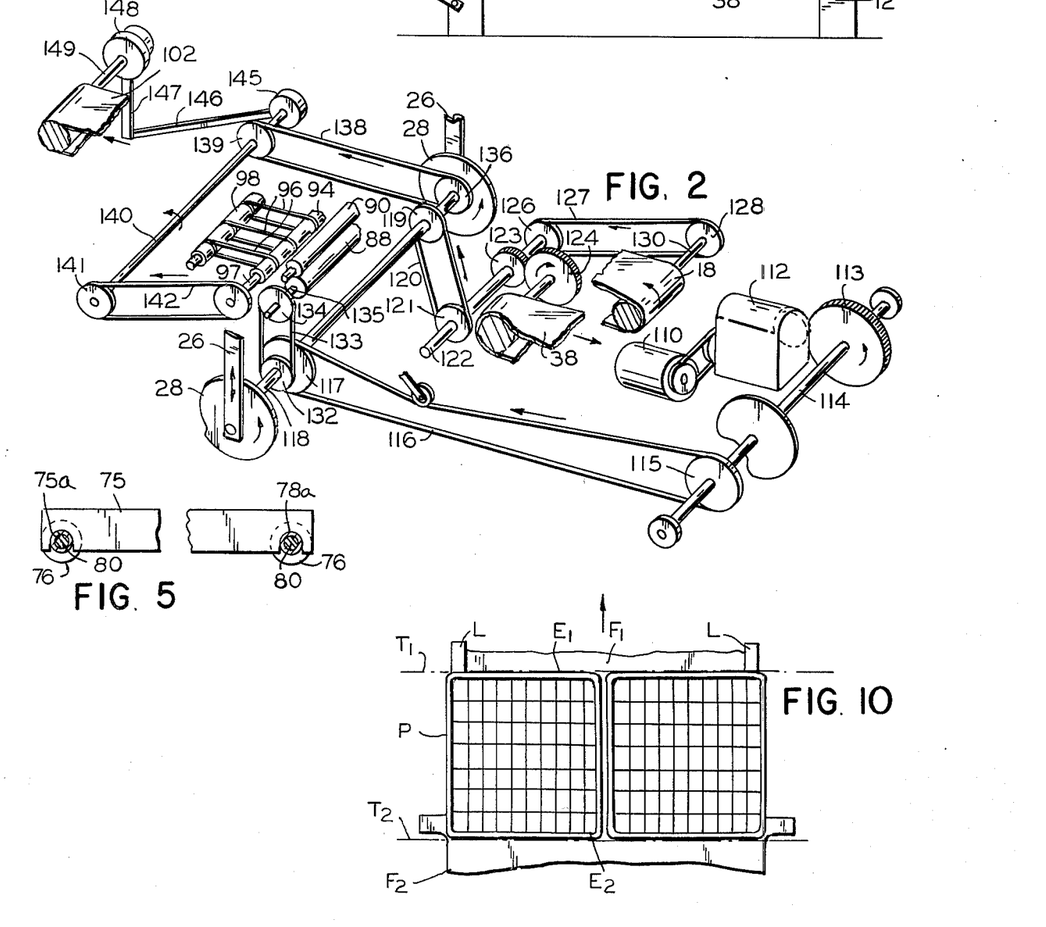
FIG. 2 is a schematic perspective view of the drive train for the various elements of the trimming apparatus.
FIG. 5 is a view taken along the line 5—5 of FIG. 4 showing a foreshortened front view of the movable stop bar of the apparatus.
FIG. 10 is a plan view of a typical grid plate casting as it comes from the mold prior to trimming.

Stop bar 75, as shown best in FIG. 5 has a pair of slots 75a along its lower edge, one positioned at each of its opposite ends to receive a selected groove 78 of the positioner spools 76. The slots enable the lifting of stop bar 75 from one set of grooves and its downward insertion into another set to quickly change the position of the stop bar along the conveyor path, thus changing the distance between the stop bar and its associated trim knife 46. These different distances represented by the different sets of grooves correspond to different lengths of grid plates capable of being produced by the grid-casting machine. Each of the sets of grooves 78a, 78b, 78c correspond, respectively, to progressively increasing lengths of grid plates.

Referring to FIGS. 3 and 4, positioner arms 83 are fixed to the upper end of a stop lifter plate 85 carried by follower arm 70 rearwardly of stop lifter 68 for forward stop 60. Thus, as the upper trim die carrying the two trim blades 44, 46 reciprocates through counterclockwise rotation of crank wheel 28 (FIG. 3), cam surface 74 of such wheel coordinates the lifting and lowering movement of the two stops 60 and 75 in times relation to the trim blade strokes. The timing is such that both stops are lowered into the conveyor path to position grid plates for trimming just before the trim blades begin their shearing action. In FIG. 3, the position of crank wheel 28 and eccentric 26b indicate that the two stops are in their lowered positions in the conveyor path, and the trim blades are traveling downward as the upper die closes.

As shown in FIG. 3, stop lifter 85 is fixed to a portion of follower arm 70 that is inclined slightly from the horizontal in a manner so that the rise and fall of the follower arm on cam surface 74 causes stop lifter 85, and thus rear stop 75 itself, to rise and fall at a slight rearward inclination from the vertical. Thus stop 75, when lifted after a trimming operation, withdraws from the leading end of the abutting grid plate, thereby preventing any lifting and possible bending of the leading end of the plate as the stop is retracted.

From the foregoing description it will be apparent that the die apparatus including the two trim knife means and their associated stops define two separate trim stations, the first for trimming the leading end of a plate and the second for trimming the trailing end in two separate trimming operations.

Three primary sets of pressure rolls are used to convey the grid plates horizontally through the trim die to and from the two trim stations when the die is open. Some of these pressure roll sets have been mentioned briefly. The first pressure roll 22 at the downstream end of conveyor belt 18 serves as a feed roll in cooperation with the belt roll 18a to feed a grid plate across first shear block 40 and against first stop bar 60 in preparation for trimming the leading end of the grid plate when the die closes. As the die reopens and stop bar 60 clears the trimmed plate, the same roll 22 aids the conveyor in moving the grid plate forwardly into a second, intermediate set of pressure rolls 88, 90 positioned between the two knife blades 44, 46. Pressure roll 22 is preferably made up of two separate roll sections 22a, 22b, as shown in FIG. 4, with each section being mounted for independent rotation on the common supporting shaft 23. This feature prevents the roll from skewing grid plates as they are fed into the die.

The intermediate set of rolls includes the lower driven roll 88 and an upper idler roll 90. This pair of pinch rolls feeds the grid plate downstream across the upper surface of second shear block 42 and between the previously mentioned third set of pressure rolls 30.

The third set of rolls includes an upper idler roll 92 urged by a compression spring 93 against a driven lower roll 94. Upper roll 92 is mounted in two separate roll sections 92a, 92b for independent rotation on its shaft 95 for the same reason that roll 22 is mounted in this manner. Lower roll 94 is made up of four separate roll sections, two of which are shown at 94a, 94b, fixed to the common driven shaft 97 and separated by grooves for receiving transfer belts 96 of which there are three 96a, 96b, 96c, shown in FIG. 4. The transfer belts extend downstream between third roll set 30 and the fourth, previously mentioned, roll set 32. Roll set 32 includes a lower pressure roll 98 of similar construction to roll 94 for receiving transfer belts 96, and a cooperative upper pressure roll 100.

Transfer belts 96 are preferably V belts and are driven by roll shaft 97. The transfer belts in turn drive the lower roll 98 of the pin roll set 32. Roll set 30 serves to feed a plate downstream against the movable stop 74. When the stop is raised following a trimming operation, the same roll set 30 serves to feed the plate downstream beneath the stop onto transfer belts 96, which in turn convey the plate between the fourth pressure roll set 32. The latter set then feeds the plate onto the conveyor belt 102 of stacking table 34.

Drive System

Referring to FIG. 2, the drive system for the trimming apparatus is driven by the same prime mover that drives the mold apparatus 14. The prime mover for both such systems is an electric motor 110 mounted low within the machine frame. Power is transmitted from this motor through a gear reducer 112 to a bull gear 113 on a cross shaft 114 journaled in bearings at opposite sides of the machine frame. A sprocket 115 near one end of shaft 114 transmits power through drive chain 116 to a second sprocket 117 on a cross shaft 118 to the opposite ends of which the crank wheels 28 are fixed. Another sprocket 119 on this shaft transmits power through driven chain 120 to a sprocket 121 on another cross shaft 122. Power is taken from this shaft through gears 123, 124 to drive the scrap conveyor 38. Power is also taken from this shaft through sprocket 126, drive chain 127, and a sprocket 128 on a shaft 130 to drive the belt feed conveyor 18. Another sprocket 132 on crank wheel shaft 118 transmits power through chain 133 to a sprocket 134 on a shaft 135 which carries the lower pinch roll 88 of the second pressure roll set.

A third sprocket 136 on crank wheel shaft 118 transmits power through drive chain 138 to a sprocket 139 on a cross shaft 140. A sprocket 141 at one end of shaft 140 transmits power through chain 142 to a sprocket on the drive shaft 97 for driving the pressure roll 94 of the third pressure roll set 30.

THe opposite end of shaft 140 carries a crank wheel 145 mountingn eccentrically a connecting rod 146 leading rearwardly to a pivotal connection with a lower end of a ratchet arm 147 of a ratchet wheel assembly 148 at one end of a drive shaft 149 for the stacking conveyor 102. Thus continuous rotation of cross shaft 140 in the direction of the arrow shown in FIG. 2 causes an intermittent rotation of conveyor drive shaft 149 and thus intermittent downstream movement of the stacking conveyor 102 to cause a buildup of trimmed grid plates thereon.

Operation

Operation of the trimming apparatus will be described with reference to FIGS. 6 through 9 and a typical grid plate casting P as it emerges from the mold of the casting machine, as shown in FIG. 10.

The objective of the trimming operation is to trim the metal flashing F-1, F-2 which results from the casting process from the grid plate P along the trim lines T-1, T-2 at the leading (bottom) and trailing (top) ends, respectively, of the grid plate. Each plate is formed in the mold 14 with a pair of indexing lugs L projecting from the leading (bottom) end of the plate for purposes of indexing the plate at the first trim station.

Each time mold 14 opens, a plate P drops downwardly from the mold onto the declining slideway 16 where it slides flat onto conveyor belt 18 with lugs L projecting forwardly. Thus end E-1 becomes the leading end of plate P and end E-2 the trailing end as it moves along the conveyor belt toward the trim die. Belt conveyor 18 moves the plate flat beneath idler rolls 20 and then between pressure roll 22 and conveyor roll 18a.

Figure 7:
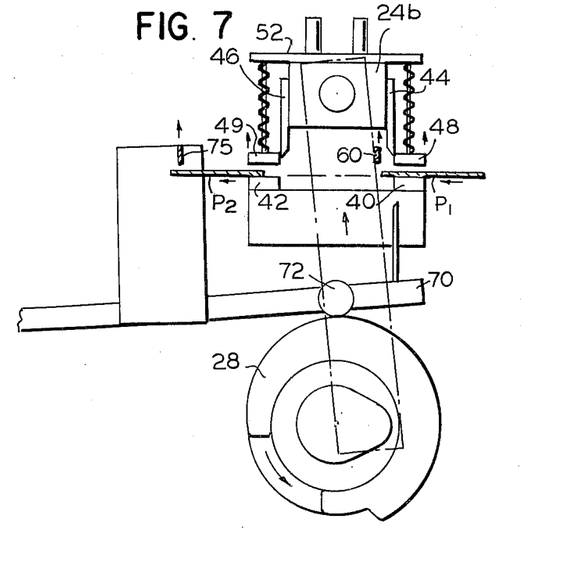
Figure 9:
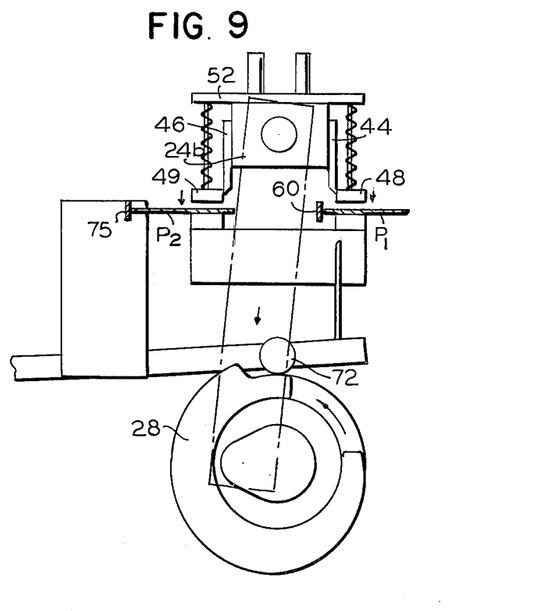

Referring first to FIG. 9, as a plate P-1 is projected into the trim die by the belt conveyor and pressure roll 22, stop 60 is down in the conveyor path so that the leading end of the plate, specifically lugs L, are conveyed into abutment against stop 60. At this point the die, while still open, closes rapidly, first bringing pressure foot 48 down into engagement with the leading end portion of plate $P_1$ then moving trim blade 44 downwardly across the inside edge of shear block 40, shearing flashing F-1 and lugs L from the plate along trim line T-1. When this occurs, the severed scrap drops onto chute 36 from which it falls onto scrap conveyor 38 for recycling. FIG. 7 shows the fully closed trim die at the end of the trimming stroke of the upper die, with both stops 60, 75 still in their down positions.

Figure 6:
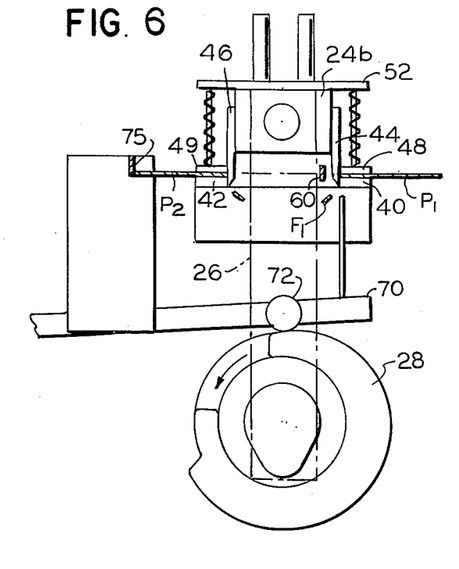
FIGS. 6, 7, 8 and 9 are similar schematic side views showing sequentially the operation of the trim die apparatus.

From FIG. 6 it will be apparent that as the leading end of plate P-1 is trimmed at the first trim station by blade 44, the trailing end of a second, preceding plate P-2 is trimed at the second trim station by blade 46.

Thereafter crank wheel 28 continues to rotate in a counterclockwise direction, opening upper die 24b and thereby raising trim blades 44 and 46 and their associated hold-down feet, and at the same time raising stops 60 and 75 as shown in FIG. 7 to release plates P-1 and P-2 from their respective trim stations. When this occurs, conveyor 18 and its associated pressure roll 22 propel plate P-1 forwardly past stop 60 and into intermediate pinch rolls 88, 90. At the same time pinch rolls 92, 94 move plate P-2 forwardly past stop 74 on transfer belts 76 into pinch rolls 98, 100.

Figure 8:
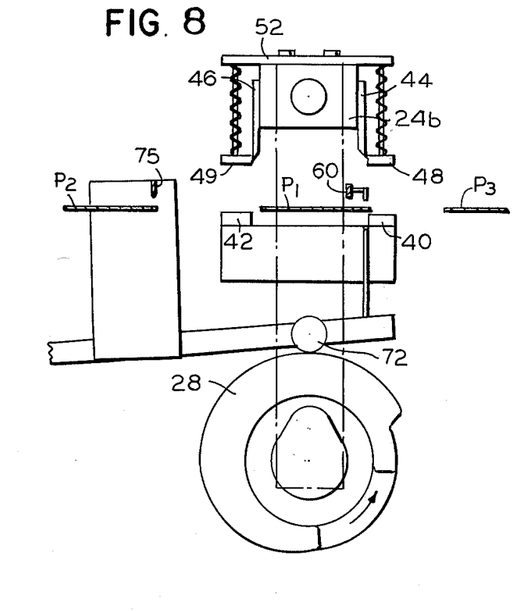

These rolls continue to convey the plates P-1, P-2 in the downstream direction while upper die 24b opens to its uppermost position and the stops remain raised, as shown in FIG. 8, with plate P-1 approaching the second trim station, plate P-2 approaching stacking conveyor 102, and a third plate P-3 approaching the first trim station.

Finally, when crank wheel 28 rotates through 360° to its FIG. 9 position again, stops 60, 75 drop back down into the conveyor path, causing the trimmed leading end of plate P-1 to abut stop 75 and the leading lugged end of plate P-3 to abut stop 60 in readiness for the next trim stroke as the still-open die rapidly closes. When the die closes fully again to its FIG. 6 position, the trimming of plate P-1 is completed with shear blade 46 shearing the flashing F-2 from the trailing end E-2 of plate P-1 along trim line T-2, causing the scrap to drop onto the scrap chute 36 for delivery to the scrap conveyor 38.

As the cycle repeats, the stops and trim blades again rise as the die opens, permitting the pinch rolls to convey plate P-1 from the second trim station on transfer belts 96, between pinch rolls 98, 100 and finally onto stacking belt 102 ready for the next manufacturing operation.

From the foregoing it will be apparent that two plates are processed in the trim die at the same time, with the leading end of one plate being trimmed at the first trim station while the trailing end of a second plate is trimmed at the second trim station. Thus one plate is completely trimmed, bottom and top, in a two-step operation during two operating cycles of the trimming apparatus, that is, during two revolutions of crank wheel 28. However, since two plates are processed at the same time, a completely trimmed plate is produced during each operating cycle.

If the mold 14 on the machine is changed to change the size of the grid plates to be cast, the trim die can be rapidly adjusted to accomodate the new-sized plates simply by lifting the stop bar 75 from one stop position 78a to another stop position 78b or 78c as required, in just a matter of a few seconds, with no adjustments to the die or front stop 60 being necessary.

Although the trimming apparatus of the invention is shown and described with reference to a specific type of grid-casting machine, it should be understood that such apparatus can be applied to any of several other well-known types of casting machines in common use.

FIG. 11 Embodiment

Figure 11:
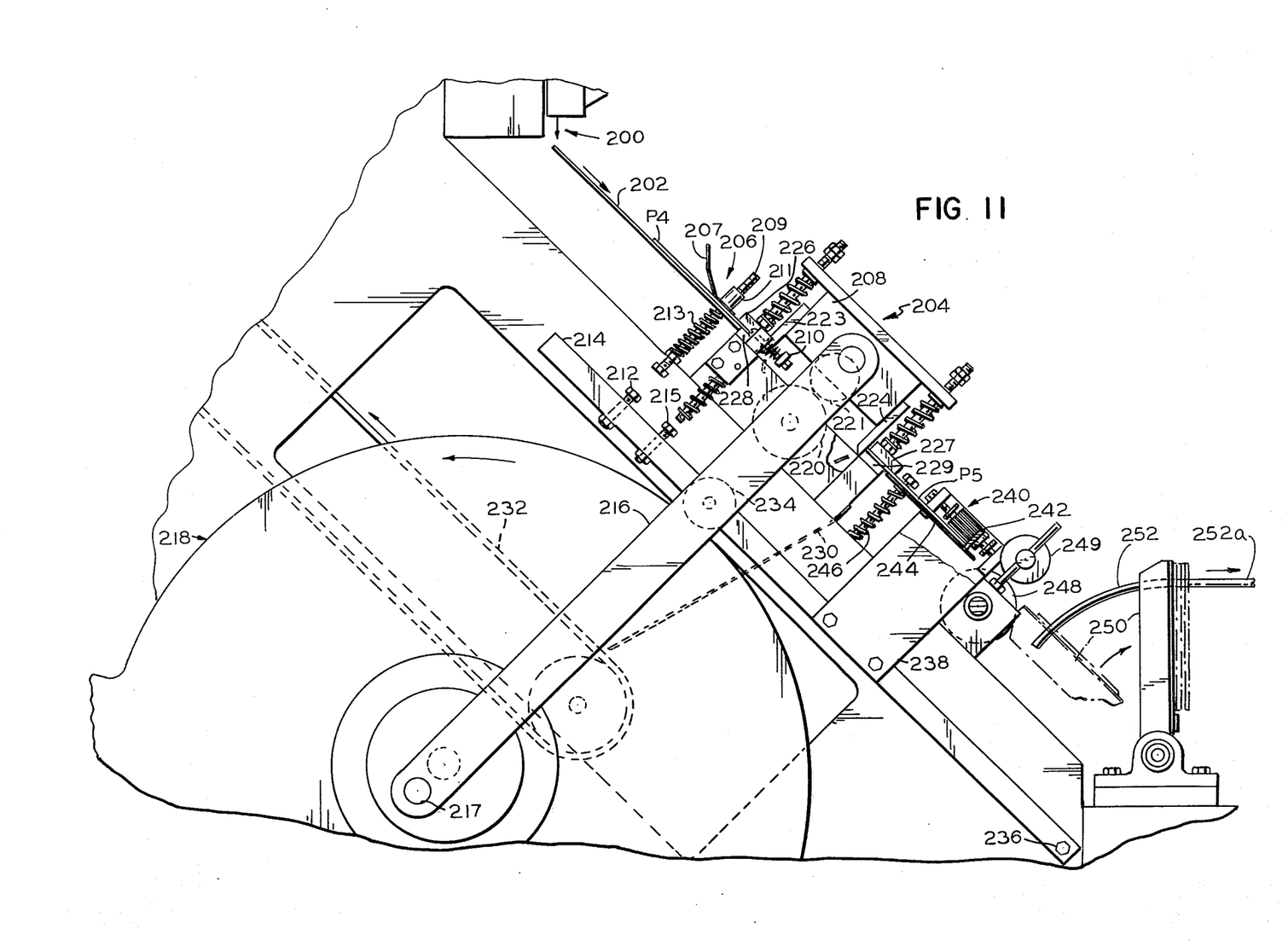
FIG. 11 is a side elevational view of the trim die apparatus of a modified form of grid-casting machine having a partial gravity feed along a sloped conveyor path.

The FIG. 11 embodiment of the trimming apparatus of the invention is similar to the embodiment shown in FIGS. 1–10 in both construction and operation with the exception that the FIG. 11 embodiment feeds grid plates by gravity along a declining slideway to the trim die apparatus from the grid mold, and the entire trim die apparatus is arranged in a continuation of the inclined plane of the slideway. However, the principals of construction and operation of the trim die of FIG. 11 are the same as those for the trim die of FIG. 3 except that gravity is used to feed the grid plates to and from the die stations rather than powered belts and rolls in most instances.

Referring to FIG. 11, grid plates P-4, P-5 are ejected from a grid mold 200 onto a relatively steeply declining smooth, flat metal slideway 202 having a low coefficient of friction and leading downwardly to the trim die apparatus indicated generally at 204. The trim die apparatus is arranged at an inclination corresponding to the declination of slideway 202. A grid plate guide 206 just upstream from a reciprocating trim die block 208 acts to straighten and slow each grid plate as it approaches a first stop bar 210. Guide 206 includes an angular guide plate 207 defining a gradually narrowing opening for the grid plate as the grid plate approaches the trim die, finally frictionally engaging the grid plate to slow it. The guide plate 207 is held in position by guide rods 209 at opposite sides of slideway 202. A sleeve 211 threaded on each rod retains the guide plate in position close to the slideway. Such rods extend downwardly through slideway 202 and are biased by relatively weak springs 213 to their operative positions shown so that a grid plate sliding down the slideway will lift the guide plate away from the slideway and be slowed and straightened in the process.

A guide lifter 212 carried by a cam follower arm 214 raises guide plate 207 at about the same time that a stop lifter 215 on the same follower arm raises the forward stop bar 210 to release grid plate P-4 as the connecting rod 216 connected to the eccentric 217 of crank wheel 218 raises the reciprocating trim die block 208. The released grid plate P-4 then slides downwardly under the raised die block 208 toward the second trim die station. The grid plate is aided in its movement through the trim die by the pair of nip rolls 220, 221, the lower one of which is driven.

The trim die block 208 itself is similar to the trim die of the previous embodiment. It includes a pair of trim knife blades 223, 224, one fixed to each of opposite sides of die block 208, the forward one 223 of which trims the leading end of one grid plate at the same time that the other one 224 trims the trailing end of a second grid plate. Each blade has an associated hold-down foot 226, 227 carried by die block 208, each foot pressing a grid plate against an associated shear block 228, 229 as the trim blades move downwardly with die block 208 to trim the grid plates.

Scrap from the trimming operations falls by gravity onto a scrap chute 230 along which the scrap slides onto an inclined driven scrap conveyor belt 232 leading upwardly toward a melting pot (not shown) for remelting.

Crank wheel 218 serves both to drive the die block 208 through connecting rod 216 and to drive follower arm 214 through contact of a follower wheel 234 with the peripheral cam surface of crank wheel 218.

Follower arm 214 is pivoted at 236 to the frame of the machine. Such arm carries a stop lifter plate 238 for lifting a second grid plate stop indicated generally at 240 at the second trim die station. Stop structure 240 is similar to the corresponding stop structure of the previous embodiment so need not be described in detail. Essentially it is a multiple position stop having a stop bar 242 which can be shifted manually to any one of three positions so that the trim die apparatus will accomodate three different sizes of grid plates.

The second die station includes a second declining slideway 244 which forms a continuation of the first slideway 202. Slideway 244 is provided with a height adjustment rod and spring assembly 246 to adjust the level of the upper end of the slideway so that grid plates moving through the die will not hang up on such upper end. Slideway 244 supports a second grid plate P-5 at the second trim station with the leading edge of the grid plate abutting stop bar 242 as the hold-down foot 227 presses the trailing edge portion of the plate against shear block 229 and knife blade 224 trims the trailing edge.

After plate P-5 is trimmed, upward movement of follower arm 214 causes lifter plate 238 to raise stop bar 242 as connecting rod 216 raises die block 208 and foot 227, releasing plate P-5. Plate P-5 slides down slideway 244 between a pair of nip rolls 248, 249 which boost the plate in its downward path onto the inclined surface of a tilt-up stacker arm 250. Projecting side lugs (see FIG. 10) on the grid plate engage opposite side rails 252 of the stacker. The stacker arm then pivots from its dashed-line inclined position to its vertical full-line position as shown in FIG. 11 to push the grid plate along a curved portion of rails 252 onto horizontal rail portions 252a where the plates are accumulated. Other types of plate accumulators could be used instead of the stacker shown, such as a horizontal conveyor belt to which the plates are delivered by nip rolls 248, 249.

The sequence of operation of the trim die of FIG. 11 is as shown in FIGS. 6 through 9, the only difference being that the trimming operations take place along an inclined plane rather than in a horizontal plane, thereby eliminating the need for the powered conveyor belts and two sets of the nip rolls shown in FIG. 3.

Having illustrated and described what are presently preferred embodiments of the invention, it should be apparent to those skilled in the art that the same permit of modification in arrangement and detail. I claim as my invention all such modifications as come within the true spirit and scope of the following claims.

I claim:

1. A method of trimming flashing from battery grid plate castings each having a leading end and a trailing end, comprising the steps:

moving a grid plate along a path of travel and abutting the untrimmed leading end of said plate against a first stop in said path, trimming the flashing from said leading end with a first trim blade while said end abuts said first stop, removing said first stop from said path and conveying said plate beyond said first stop to a second stop in said path and abutting the trimmed said leading end against said second stop, and with said leading end abutting said second stop, trimming the flashing from said trailing end with a second trim blade spaced downstream along said path from said first blade.

2. The method of claim 1 including moving said first and second trim blades together simultaneously across said path with a first said grip plate against said first stop and a second said plate against said second stop so as to trim flashing from two grid plates simultaneously.

3. The method of claim 1 including changing the distance along said path between said second stop and said second trim blade to enable trimming grid plates of different lengths without the need for changing trim dies.

4. The method of claim 1 including positioning said first and second trim blades respectively at fixed positions along said path and selectively moving said second stop to different positions along said path downstream of said second trim blade corresponding to different lengths of plates to be trimmed to enable trimming plates of different widths with a single trim die apparatus.

5. The method of claim 1 including moving a first plate having an untrimmed leading end into abutment against said first stop and simultaneously moving a second plate having a trimmed leading end into abutment against said second stop, then trimming the leading end of said first plate and the trailing end of said second plate at the same time.

6. The method of claim 5 including moving said first and second stops from said path after said trimming operation, then simultaneously moving said second plate downstream of said second stop, said first plate into abutment against said second stop and a third plate into abutment against said first stop and repeating said trimming operation on said second and third plates.

7. The method of claim 1 including conveying a series of said plates in close succession first against said first stop and trimming said leading end with said first blade, then against said second stop and trimming said trailing end with said second blade, and then beyond said second stop to a collecting point, and trimming the trailing end of one plate against said second stop with said second blade while trimming the leading end of the next-following plate against said first stop with said first blade.

8. The method of claim 1 wherein the grid plate is moved along a horizontal path against said first and second stops.

9. The method of claim 1 wherein the grid plate is moved along a declining path against said first and second stops at least partly under the influence of grav- 10. In an apparatus for trimming battery grid plate castings,
moving means for moving grid plate flat along a path of travel,
stop means movable alternately into and out of said path in timed relation to the operating speed of said moving means to alternately prevent (or) and permit movement of plates along said path by said moving means beyond said stop means,
trim blade means positioned along said path upstream of said stop means and including a first trim blade movable into and out of said path in timed relation to the movement of said stop means for trimming flashing from a leading end of a grid plate and a second trim blade spaced downstream along said path from said first trim blade and movable into and out of said path simultaneously with said first trim blade for trimming flashing from a trailing end of a grid plate having its leading end in abutment against said stop means,
said stop means being movable to different predetermined positions along said path downstream of said second trim blade to enable trimming grid plates of different widths.

11. Apparatus according to claim 10 including stop-positioning means defining multiple stop positions for said stop means along said path, said stop means being selectively movable to any of said multiple positions.

12. Apparatus according to claim 11 wherein said stop-positioning means defines multiple pairs of slots at opposite sides of said path and said stop means comprises a stop bar extending across said conveyor path and insertable into any of said pairs of said slots, the position of said stop bar being changed by lifting it from one pair of said slots and inserting it into another said pair.

13. Apparatus according to claim 11 wherein said stop-positioning means includes means for adjusting said predetermined multiple stop positions along said path.

14. Apparatus according to claim 10 including second stop means movable into and out of said path and spaced from said first-mentioned stop means along said path for positioning a grid plate for trimming of its leading end in a separate trimming operation removed in time and position from said first-mentioned trimming operation at said trailing end.

15. In an apparatus for trimming battery grid plate castings,
moving means for moving grid plates flat along a path of travel,
a first trim station along said path including a first stop means movable into and out of said path for interrupting movement of a grid plate past said station and a first trim blade means positioned upstream of said stop means and movable into and out of said path in timed relation to the movement of said first stop means for trimming flashing from the leading end of a grid plate in abutment against said first stop means,
a second trim station spaced along said path from said first trim station including a second stop means movable into and out of said path for interrupting movement of a grid plate past said second station and second trim blade means positioned upstream of said second stop means and movable into and out of said path in timed relation to the movement of said second stop means for trimming the trailing end of a grid plate in abutment against said second stop means.

16. Apparatus according to claim 15 including a powered conveyor means operable to move grid plates in succession from said first station to said second station.

17. Apparatus according to claim 15 wherein at least said second stop means is movable to multiple predetermined positions along said path for trimming grid plates of different lengths.

18. Apparatus according to claim 15 wherein said first and second movable trim blades are spaced apart along said path and carried by a common trim die element movable toward and away from said path such that said blades move together into and out of said path.

19. In an apparatus for trimming battery grid plate castings,
moving means for moving grid plates flat along a path of travel,
a first trim station along said path including a first stop means movable into and out of said path for interrupting movement of a grid plate past said station and a first trim blade means positioned upstream of said stop means for trimming flashing from the leading end of a grid plate in abutment against said first stop means,
a second trim station spaced along said path from said first trim station including a second stop means movable into and out of said path for interrupting movement of a grid plate past said second station and second trim blade means positioned upstream of said second stop means for trimming the trailing end of a grid plate in abutment against said second stop means,
said moving means being operable to move one grid plate to said first station and another grid plate to said second station at the same time, said first and second blade and stop means being operable together so that the leading end of one plate is trimmed at said first station while the trailing end of aanother plate is trimmed at said second station.

20. Apparatus according to claim 15 wherein:
said first trim station is upstream of said second trim station,
and said first and second trim knife means include, respectively, first and second fixed shear blocks below said path and first and second movable shear blades above said path,
said shear blocks each including a flat upper surface portion positioned for supporting a portion of a grid plate in said path,
said first and second shear blades being fixed to a common movable die element above said conveyor path mounted for movement in a direction normal to said path,
die drive means operable to reciprocate said movable die element to move said first and second shear blades into periodic shearing cooperation with said first and second shear blocks,
and stop drive means for reciprocating said first and second stop means into and out of said conveyor path in timed relation to the reciprocating movement of said die element to enable simultaneous trimming of the leading end of one grid plate at said first station and the trailing end of another grid plate at said second station and the transfer of plates from said first station to said second station by said moving means.

21. Apparatus according to claim 20 including a driven pressure roll means between said first and second trim stations for transferring plates form said first station toward said second station.

22. Apparatus according to claim 15 wherein said path of travel through said first and second trim station extends in a horizontal plane and includes driven conveyor means for moving said plates to said first and second stations.

23. Apparatus according to claim 15 wherein said path of travel through said first and second trim station extends in a declining plane in the direction of movement of said grid plates.

* * * * *